Patented Feb. 10, 1942

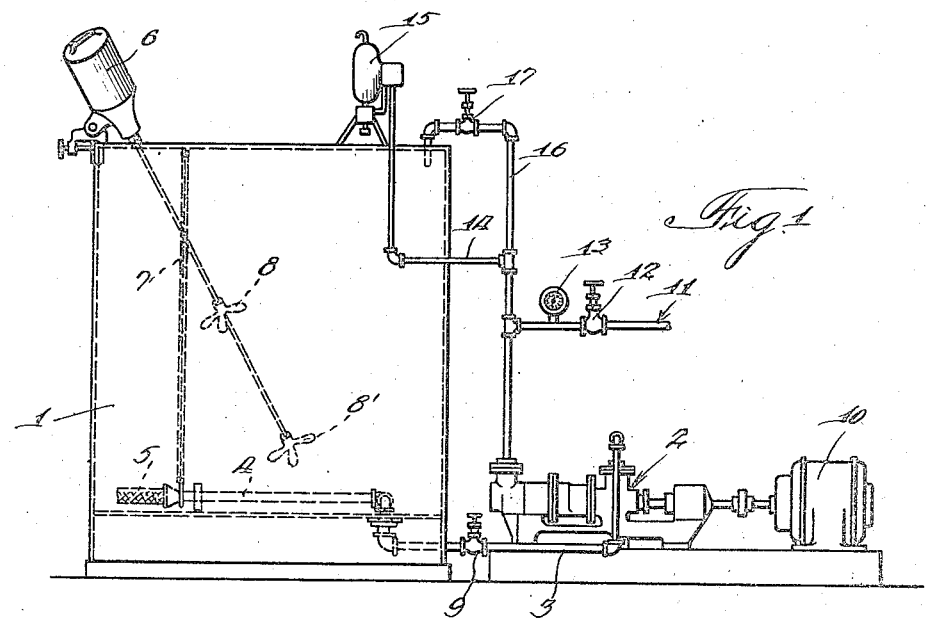
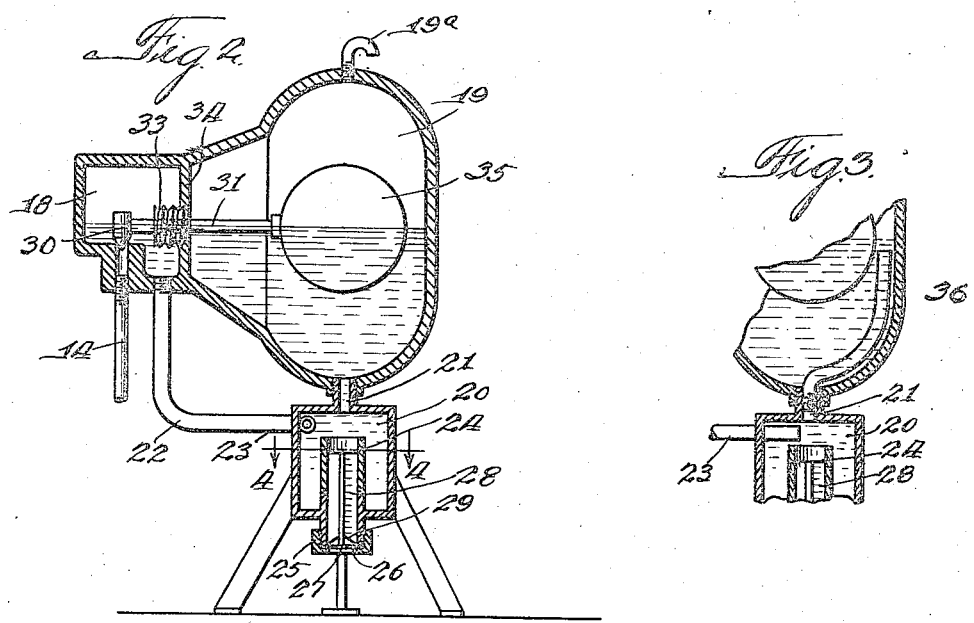
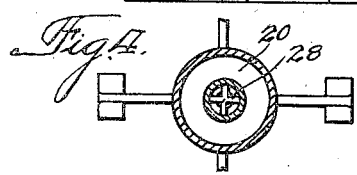

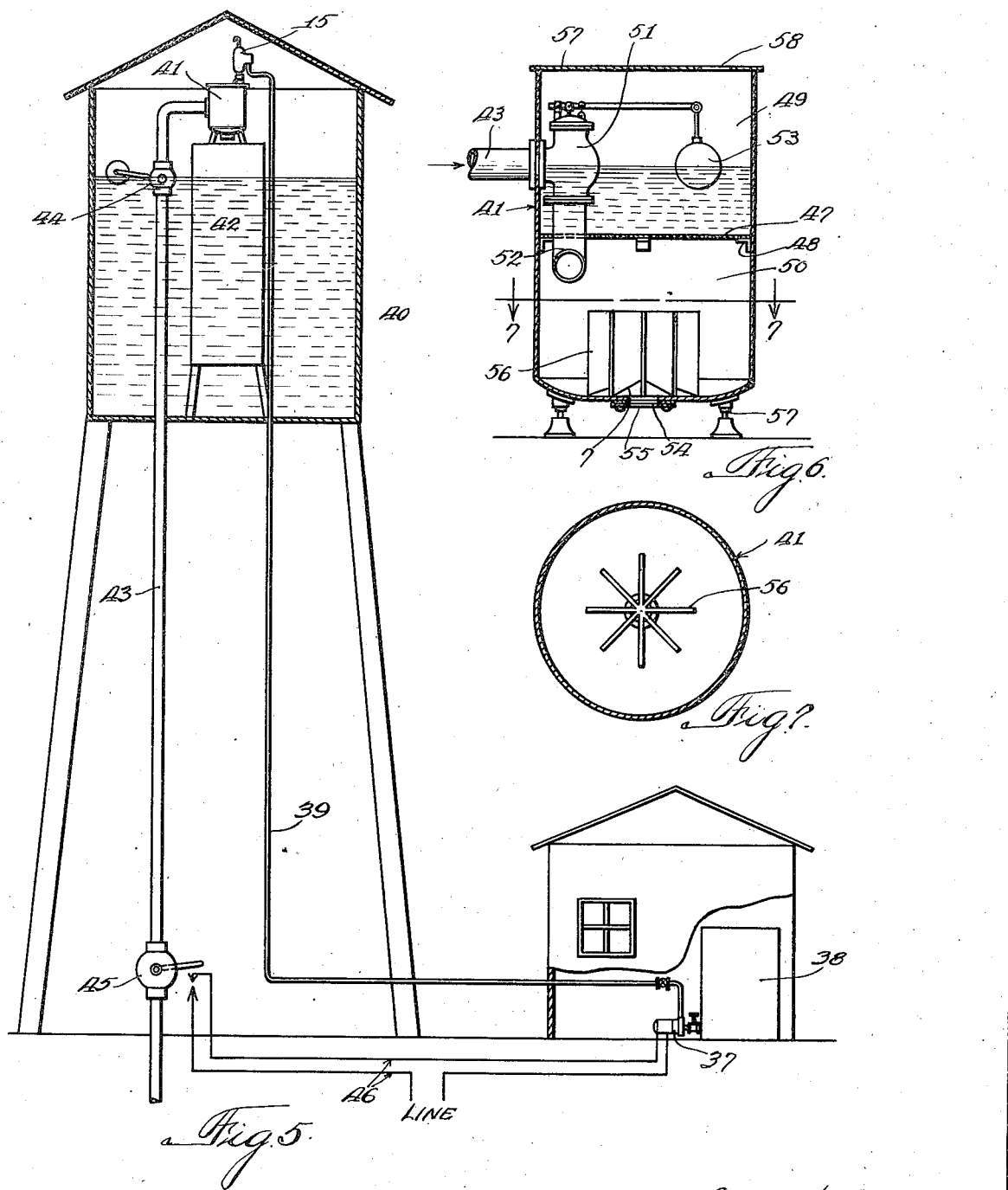

2,272,721

UNITED STATES PATENT OFFICE 2,272,721

FLUID REGULATING AND PROPORTIONING DEVICE

Verl E. McCoy, La Grange, Ill., assignor to National Aluminate Corporation, Chicago, Ill., a corporation of Delaware Application January 12, 1939, Serial No. 250,508

7 Claims. (Cl. 103—41)

This invention relates to flow regulating systems, and more particularly to a method and apparatus for regulating the flow of chemical or other liquid into water conduits or storage tanks and the like, wherein a predetermined positive discharge from the system into the conduit or reservoir may be maintained irrespective of variations in discharge line pressure.

The invention provides a fluid proportioning system which may be used in connection with a positive displacement pump and in which a proportioning unit is provided which is automatically operable to insure the by-passing of a definite quantity of chemical or other fluid from the discharge back to the chemical vat proportional to the discharge from the system regardless of variations in discharge line pressure.

The automatic proportioning unit for use in the system has many applications and a single unit may be used to proportion the output of a positive displacement pump or the same unit may be used to regulate the discharge of a centrifugal pump irrespective of back pressure. Also, two or more of the proportioning units may be used in a system arranged for the proportioned flow of water and chemical or accurately to proportion the output of exchange type softeners regardless of the resistance of the exchanger units. The invention is particularly desirable for accurate proportioning of a plurality of liquids, for instance, such as in treating waters by mixing or blending the output of hydrogen exchangers with the output of alkali exchangers in a predetermined proportion to provide a neutral water. Such exchangers are commonly called "Nalcites" and zeolite, respectively.

The proportioning system disclosed herein may be used in connection with various types of pumping means or fluid pressure systems whereby the effective rate of flow from a pump or other pressure source may accurately be controlled irrespective of variations of pressure anywhere within the system and particularly irrespective of back pressure in the discharge outlet. The flow regulator unit finds many applications in connection with various types of fluid systems, including water mains, supplies from reservoirs, chemical vats and the like, wherein the back pressure against the discharge may vary greatly.

The invention may be used to regulate the inflow to water storage tanks at a fixed value which simplifies the chemical proportioning problem by eliminating the wide range of flow rate that is sometimes experienced. The device is applicable for flow regulation when the source of supply is from city mains or by gravity from reservoirs and the like.

In the past it has been common practice to regulate the output of a positive displacement pump by by-passing a portion of the discharge back to the supply through a fixed orifice, the size of this orifice being proportioned relative to a desired output. In devices of this kind, the by-pass discharge through the orifice has been at very high velocity and, consequently, the orifice has been subject to a great amount of wire drawing and cutting action, and also these orifices are subject to variation due to clogging or plugging up with sediment.

The present invention obviates these difficulties and provides an accurately controlled by-pass which is not subject to clogging or wire drawing, and the cutting action is negligible. The by-pass discharge is at a constant low velocity and at low pressure, and this permits the use of large sized orifices. In fact, the by-pass orifice is merely a drain opening from a container in which is maintained a substantially fixed low head of by-passed liquid and this head of liquid is automatically maintained substantially at a predetermined level by the by-passed fluid under atmospheric pressure. The orifices are preferably provided in stainless steel disks which are interchangeable for mounting on the unit. The orifices are of various sizes, each size corresponding to a predetermined volume discharge from the system. Therefore, by the interchangeable use of these orifice disks, any positive volume discharge from the system may accurately be maintained over substantially the entire range of the pumping unit.

Further objects will be apparent from the specification and the appended claims.

In the drawings:

Fig. 1 illustrates one embodiment of the invention comprising a pumping system equipped with a flow regulator used in connection with a constant displacement pump;

Fig. 2 is a vertical axial section through the flow regulator unit illustrated in Fig. 1;

Fig. 3 is a fragmentary sectional view illustrating the use of a level regulating drain conduit in connection with the float chamber shown in Fig. 2;

Fig. 4 is a sectional view through the orifice chamber of the regulator unit and is taken on a line substantially corresponding to line 4—4 of Fig. 2;

Fig. 5 is a diagrammatic view partially in section illustrating one application of the invention in connection with a centrifugal pump or the like;

Fig. 6 is a sectional view of another embodiment of the flow regulator;

Fig. 7 is a detail sectional view taken on a line substantially corresponding to line 7—7 of Fig. 6.

Referring to the drawings in detail, the embodiment illustrated in Figs. 1 to 4, inclusive, comprises a chemical vat or tank 1 and a positive displacement pump 2 having an inlet conduit 3 associated therewith for withdrawing chemical or other liquid from the vat 1. The inner end of conduit 3 may be provided with a suitable swing pipe 4 terminating in a strainer 5. A mixing motor 6 may be mounted on the tank and provided with an elongated shaft 7 having suitable mixing propellers 8 thereon. The outlet pipe 3 from the tank to the pump may be provided with a suitable control valve 9 and the pump 2 may be of any suitable positive displacement type, either single or duplex, and may continuously be operated from any suitable power source, such as a motor 10.

The pump 2 is provided with a discharge outlet conduit 11, which may be controlled, if desired, by means of a valve 12 and may have a pressure gauge 13 associated therewith. The discharge conduit 11 is provided with a by-pass conduit 14 which is connected to a proportioning unit 15, through which unit a predetermined flow of fluid is by-passed back into the vat 1. The by-pass conduit 14 discharges the fluid into the unit 15, from which it is drained through a suitable orifice. A substantially fixed low head of fluid automatically is maintained in the proportioning unit. The unit 15 is preferably positioned at the top of the tank or vat as shown. A test conduit 16 may also be provided for discharging fluid back into the vat during testing of the pump or other parts of the system, and this test conduit is provided with a valve 17, whereby it may be closed during normal operation of the device.

The proportioning unit 15 is disclosed in detail in Figs. 2, 3, and 4, and comprises a housing having a comparatively small inlet chamber 18 into which the by-pass conduit 14 discharges through a suitable inlet passage. The unit is also provided with an enlarged float chamber 19. An orifice chamber 20 is positioned below the float chamber, as illustrated, and communicates therewith through a restricted passage 21. Fluid entering the inlet chamber 18 is discharged into the orifice chamber 20 through a conduit 22. The conduit 22 is provided with a tangent outlet 23 in the orifice chamber and this orifice chamber is provided with an axial tubular extension 24 therein which also extends downwardly below the orifice chamber and is provided with a coupling cap 25 threaded thereon and arranged to removably support an orifice disk 26 having an orifice 27 therein.

A plurality of orifice disks 26 may be provided, each having an orifice of predetermined size therein, whereby the disks may be interchangeable for varying the positive discharge from the discharge conduit 11. These disks are preferably very thin and of stainless steel. The fluid energy from the by-pass 14 is effectively dissipated in the chamber 18 and in the orifice chamber 20, and therefore the fluid flow through the orifice is at a slow rate, determined only by the liquid level in the flat chamber.

In order that the liquid may flow from the orifice chamber through the tubular member and out of the orifice 27 without the formation of eddy currents, a suitable baffle member 28 is removably supported in the tubular member 24 as shown. This baffle member is preferably of sheet metal and provided with vertical laterally extending vanes, as shown in Fig. 4. The lower end of the member is provided with inverted V notches 29, whereby the orifice is unobstructed and a continuous flow at a constant rate may be maintained therethrough.

The by-pass opening into the inlet chamber 18 provides a suitable valve seat, as shown, and a conical valve 30 is arranged to co-operate with this valve seat to control the opening. A so-called V-ported balanced valve of a well known type may be used which will regulate very accurately with a minimum of wire drawing or cutting action to the valve seats or to the valve body itself. The valve 30 is provided with a control lever 31 pivoted at 32 in a partition 34 between the inlet chamber and the float chamber, and the outer end of the lever is provided with a suitable float 35 in the float chamber. It will be apparent that fluid is discharged into the inlet chamber 18 under considerable pressure and the energy is effectively dissipated in this inlet chamber and in the orifice chamber 20, and turbulence in the float chamber 19 is effectively prevented. Sudden fluctuations of the valve 30 are, therefore, prevented and a substantially constant rate of flow is maintained.

Fig. 3 illustrates a preferred form of float chamber in which a drain pipe 36 is provided with its inlet immediately below the predetermined water level to be maintained in the float chamber. This pipe communicates directly with the orifice chamber 20 and limits the liquid level in the float chamber when the pump is stopped for any reason. The float chamber is provided with a suitable vent 19a so that the interior of the regulator is always at atmospheric pressure.

Fig. 5 illustrates an embodiment in which one of the flow regulators previously described is used to regulate and predetermine the flow of chemical solution from an impositive displacement source, such as a centrifugal pump, to a water storage tank. The flow of water to the tank from any suitable pressure source is also controlled by a similar type of flow regulator 41 which is particularly adapted for use in controlling a large volume flow and is illustrated in detail in Figs. 6 and 7. This large volume flow regulator 41 is also positioned above the water level in the tank 40 and is preferably arranged to discharge into any suitable downcomer 42. The chemical solution regulator 15 may be mounted above the regulator 41 to discharge therein, if desired, which provides some advantages in that the chemical solution is immediately and thoroughly mixed with the inflowing water. The water is delivered to the regulator 41 through a conduit 43 from any suitable pressure source, and, of course, liquid may be withdrawn from the tank either continuously or intermittently through any suitable outlet, not shown.

The water level in the tank may be controlled by a suitable float valve 44 in the usual manner and the water conduit 43 may also be provided with a flow switch 45 adapted to control an electrical circuit 46 for operating the motor of the centrifugal pump 37. The flow switch control arrangement is such that the motor is operated to pump chemical solution only when water is flowing in the conduit 43. Therefore, the flow of chemical solution will always be proportional to the flow of water in the conduit 43.

The volume rate of liquid discharged from an impositive displacement pump is dependent upon the back pressure in the discharge outlet. It is, therefore, possible to increase or decrease the output from a centrifugal pump merely by slightly decreasing or increasing the back pressure. Therefore, if the back pressure is varied by some outside means, the amount of fluid pumped by the centrifugal pump will be affected thereby and, consequently, no definite positive flow of liquid from the pump is assured.

In the embodiment shown in Fig. 5, a liquid such as a chemical solution may be pumped by a centrifugal pump 37 from a suitable vat 38 and through a pipe line 39 to the top of a water tank 40, where the output is delivered to the tank through a flow regulator 15 such as previously described and shown in detail on Fig. 2 and which is mounted above the water level. The discharge from the flow regulator 15 may accurately be predetermined by selecting and inserting one of the interchangeable orifice plates 26 having an orifice of a size corresponding to the desired volume flow. The discharge from the regulator 15 will be at a constant rate unaffected by variations of pressure in the pipe line 39. If the capacity of the centrifugal pump 37 is greater than the capacity of the orifice of the flow regulator 15, the discharge from the orifice will remain substantially constant.

It is not necessary to provide a by-pass or overflow means for a pump of the centrifugal type or for any impositive displacement means, since the volume rate of flow is directly dependent on the back pressure exerted by the float controlled valve within the flow regulator. It is sufficient that the pump be operated at a rate to maintain the normal liquid level within the float chamber.

The large-volume flow regulator 41 is illustrated in detail in Figs. 6 and 7 and comprises a comparatively large container having a horizontal perforated partition 47 therein which may be removably supported on brackets 48. This partition divides the container into a float chamber 49 and an orifice chamber 50. The water conduit 43 enters the float chamber as shown and is provided with a float operated valve 51 which is preferably of the V-ported balanced type which will regulate closely without wire drawing or cutting action. The valve 51 discharges into the orifice chamber through an extension conduit 52 which is arranged for tangent discharge into the orifice chamber. The valve 51 is provided with the usual float 53 and the perforated partition 47 effectively prevents turbulence in the float chamber. The orifice chamber is provided with a bottom opening in which it mounted a removable orifice plate 54 having a suitable orifice 55 therein. The orifice plate 54 is interchangeable with similar plates having various sized orifices and may be mounted in the same manner as previously described for the flow regulator 15.

A series of radial baffle plates 56 are positioned over the orifice opening and the lower ends of these baffles are provided with V-shaped notches 57 to avoid obstructing the orifice opening. These baffle plates prevent eddy currents adjacent the orifice. The regulators 41 which are adapted for large volume flow may be provided with suitable adjustable jacks 57 for support and adjustment. The regulator 41 is provided with a cover 51 and the flow regulator 15 may be supported on this cover and arranged to direct its outflow into the float chamber through an opening 58 in the cover.

It is not essential that the chemical solution regulator should discharge into the water regulator. However, this method of operation presents some advantages, particularly with respect to efficient mixing of the solution with the water. The mixed and properly proportioned flow from the regulator 41 will remain constant irrespective of variations in water pressure within the main 43 or variations in chemical solution pressure in the conduit 39, providing only that the total volume rate of flow into the flow regulators is sufficient to maintain both floats 49 and 35 substantially at their normal operating levels.

Modifications may be made without departing from the spirit of the invention, and it is therefore desired that the invention be limited only by the prior art and the scope of the appended claims.

Having thus described this invention, what is claimed and desired to be secured by Letters Patent is:

1. In an automatic fluid proportioning system, the combination with a positive displacement pump for withdrawing fluid from a supply and discharging through a variable pressure outlet, of a flow regulator arranged to by-pass fluid from said outlet to said supply, said regulator comprising a container open to atmospheric pressure having an inlet from said pump discharge outlet and a restricted fixed drain outlet to said supply, a valve for said regulator inlet, and means responsive to the fluid level in said container for controlling said valve to maintain a substantially fixed pressure head of fluid in said container at atmospheric pressure so that the flow through said fixed drain outlet remains constant irrespective of varying pressure in the system.

2. In an automatic fluid proportioning system, the combination with a positive displacement pump for withdrawing fluid from a supply and discharging through a variable pressure outlet, of a flow regulator arranged to by-pass fluid from said outlet to said supply, said regulator comprising a container open to atmospheric pressure and having an inlet from said pump discharge outlet and a restricted fixed drain outlet to said supply, a valve for said regulator inlet, and means responsive to the fluid level in said container for controlling said valve to maintain a substantially fixed pressure head of fluid in said container, said restricted outlet being proportioned to maintain a desired constant fixed velocity flow from said system irrespective of variations in pressure.

3. In a fluid proportioning system, the combination with a pumping means, of a fluid regulator for the pump discharge comprising a container open to atmospheric pressure into which at least a portion of the output of the pump under varying pressure is discharged, a float operated valve in the discharge inlet to said container for maintaining a continuous volume flow at varying velocity to maintain a substantially constant liquid level in said container, said container having a relatively large fixed drain orifice for a continuous predetermined volume flow therefrom at a fixed velocity and less volume than the maximum capacity of said pump means.

4. In an automatic fluid proportioning system, the combination with a chemical vat or tank and a positive displacement pump for withdrawing liquid from said tank and discharging through a variable pressure conduit, of a by-pass flow regulator to by-pass liquid from said pump discharge conduit into said tank, said regulator comprising a container open to atmospheric pressure and positioned above the normal liquid level of said tank and having a valve inlet from said variable pressure discharge conduit and a fixed flow drain outlet into said tank, a float in said container to control said valve to maintain a substantially constant maximum liquid level therein at atmospheric pressure so that said drain continuously operates at a constant pressure and constant volume flow, irrespective of varying pressure in said pump outlet conduit.

5. In an automatic fluid proportioning system, the combination with a chemical vat or tank and a positive displacement pump for withdrawing liquid from said tank and discharging through a variable pressure conduit, of a by-pass flow regulator to by-pass liquid from said pump discharge conduit into said tank, said regulator comprising a container positioned above the normal liquid level of said tank, said container being open to atmospheric pressure and comprising a valve chamber having a valve inlet from said variable pressure conduit, a float chamber, a float in said float chamber for controlling said valve to maintain a substantially fixed liquid level in said container, and a drain chamber having a fixed drain orifice into said chemical tank, said valve chamber communicating with said float chamber through said drain chamber.

6. In an automatic fluid proportioning system, the combination with a chemical vat or tank and a positive displacement pump for withdrawing liquid from said tank and discharging through a variable pressure conduit, of a by-pass flow regulator to by-pass liquid from said pump discharge conduit into said tank, said regulator comprising a container open to atmospheric pressure and positioned above the normal liquid level of said tank, said container comprising a valve chamber, a float chamber having a float therein adapted to control said valve to maintain a substantially fixed liquid level in said container at atmospheric pressure, a drain chamber having a fixed drain orifice into said chemical tank, a drain outlet from said valve chamber into said drain chamber, and a conduit leading from immediately below said fixed liquid level into said drain chamber.

7. In an automatic fluid proportioning system, the combination with a chemical vat or tank and a pump for drawing liquid from said tank and discharging through a variable pressure conduit, of a by-pass regulator to by-pass liquid from said pump discharge conduit into said tank, said regulator comprising a container having a float chamber and a drain chamber below said float chamber and communicating therewith and open to atmospheric pressure, a by-pass inlet communicating with said drain chamber, a valve in said by-pass inlet and controlled by said float to maintain a substantially fixed liquid level in said container, and a fixed drain orifice in said drain chamber and communicating with said tank.

VERL E. McCOY.